(12) United States Patent
Kurotsu et al.

(10) Patent No.: US 7,719,703 B2
(45) Date of Patent: May 18, 2010

(54) PRINT CONTROL PROGRAM AND MEDIUM AND INFORMATION PROCESSING APPARATUS

(75) Inventors: Noriyoshi Kurotsu, Kanagawa (JP);
 Masamichi Oshima, Tokyo (JP);
 Hidekazu Morooka, Kanagawa (JP);
 Takashi Yagita, Kanagawa (JP);
 Koichiro Wanda, Kanagawa (JP); Koji Kikuchi, Kanagawa (JP); Kei Kitagata, Kanagawa (JP); Hiroyuki Kayama, Kanagawa (JP); Kenichi Shirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1123 days.

(21) Appl. No.: 10/775,090

(22) Filed: Feb. 11, 2004

(65) Prior Publication Data

US 2004/0160613 A1 Aug. 19, 2004

(30) Foreign Application Priority Data

Feb. 12, 2003 (JP) .............................. 2003-033782

(51) Int. Cl.
 *G06K 15/00* (2006.01)
(52) U.S. Cl. .................................... 358/1.14; 358/1.15
(58) Field of Classification Search .................. 707/10; 358/1.14–1.16; 715/736; 235/462.15
See application file for complete search history.

(56) References Cited

U.S. PATENT DOCUMENTS

| | | | | | |
|---|---|---|---|---|---|
| 5,287,434 | A | * | 2/1994 | Bain et al. ............. | 235/462.15 |
| 6,115,132 | A | * | 9/2000 | Nakatsuma et al. ........ | 358/1.14 |
| 6,380,951 | B1 | * | 4/2002 | Petchenkine et al. ........ | 715/736 |
| 6,466,935 | B1 | * | 10/2002 | Stuart .......................... | 707/10 |
| 6,685,292 | B2 | | 2/2004 | Oshima ....................... | 347/14 |
| 7,468,802 | B1 | * | 12/2008 | Johnson et al. ............ | 358/1.15 |
| 2002/0030851 | A1 | | 3/2002 | Wanda ...................... | 358/1.15 |
| 2002/0054321 | A1 | | 5/2002 | Kikuchi ..................... | 358/1.15 |
| 2002/0131069 | A1 | * | 9/2002 | Wanda ...................... | 358/1.14 |
| 2003/0046314 | A1 | | 3/2003 | Morooka .................... | 707/500 |
| 2003/0053082 | A1 | | 3/2003 | Tomito et al. .............. | 358/1.12 |
| 2003/0053105 | A1 | | 3/2003 | Morooka et al. ........... | 358/1.13 |
| 2003/0053106 | A1 | | 3/2003 | Kuroda et al. ............. | 358/1.13 |
| 2003/0225821 | A1 | | 12/2003 | Wanda ...................... | 709/201 |
| 2003/0227648 | A1 | | 12/2003 | Oshima et al. ............. | 358/1.15 |
| 2004/0156069 | A1 | | 8/2004 | Kurotsu et al. ............. | 358/1.13 |

FOREIGN PATENT DOCUMENTS

| | | |
|---|---|---|
| JP | 8123637 A | 5/1996 |
| JP | 2000089921 A | 3/2000 |
| JP | 2002-196916 | 7/2002 |

OTHER PUBLICATIONS

European Search Report dated Feb. 11, 2010.

\* cited by examiner

*Primary Examiner*—Mark K Zimmerman
*Assistant Examiner*—Lennin R Rodriguez
(74) *Attorney, Agent, or Firm*—Fitzpatrick, Cella, Harper & Scinto

(57) ABSTRACT

A print control program executed by an information processing apparatus, which spools print data created and spooled via a print data creation module such as a printer driver again and concurrently performs the re-spooling and output of the print data to a resending destination or an alternate device. It is thereby possible to speed up a throughput of the output on alternation of printing or resending.

12 Claims, 17 Drawing Sheets

FIG. 8

PRINT

PRINTER
PRINTER NAME (N): PRINTER E  [PROPERTY (P)]
  PRINTER A
  PRINTER B
  PRINTER C
  PRINTER D
  PRINTER E  — 801
  AUTOMATIC ALTERNATE
  BROADCAST

STATUS:
TYPE:
LOCATION:
COMMENT:
☐ OUTPUT TO FILE (L)

PRINT RANGE
◉ ALL (A)
○ CURRENT PAGE (E)     ○ SELECTED PORTION (S)
○ PAGE SPECIFICATION (G) [          ]
SPECIFY IT BY SEPARATING PAGE NUMBERS WITH
COMMAS SUCH AS 1, 3, 6 OR SPECIFY A PAGE RANGE
SUCH AS 4-8.

[1] [2] [3]
☐ COLLATION (T)

PRINT SUBJECT (W): DOCUMENT ▶
PRINT SPECIFICATION (R): ALL THE PAGES ▶

ENLARGE/REDUCE
NUMBER OF PAGES PER SHEET (H): 1 PAGE ▶
SIZE SPECIFICATION (Z): NO MAGNIFICATION SPECIFIED ▶

[OPTION (O)...]          [OK]     [CLOSE]

FIG. 13A

| | | |
|---|---|---|
| 1301 | JOB IDENTIFIER | SECOND ID |
| 1302 | ORIGINAL JOB IDENTIFIER | SECOND ID |
| 1303 | OS JOB IDENTIFIER | FIRST ID |
| 1304 | FILE NAME | JOB FILE 609 |
| 1305 | PRINTER NAME | PRINTER E |
| 1306 | PORT NAME | PROXY OUTPUT PORT E |
| 1307 | STATUS | SPOOLING-DELETING |
| 1308 | TIME OF RECEIPT | X:X:X |
| 1309 | PRIORITY | 1 |

FIG. 13B

| | | |
|---|---|---|
| 1310 | JOB IDENTIFIER | THIRD ID |
| 1311 | ORIGINAL JOB IDENTIFIER | SECOND ID |
| 1312 | OS JOB IDENTIFIER | FIRST ID |
| 1313 | FILE NAME | JOB FILE 609 |
| 1314 | PRINTER NAME | PRINTER B |
| 1315 | PORT NAME | PROXY OUTPUT PORT B |
| 1316 | STATUS | TO BE TRANSMITTED |
| 1317 | TIME OF RECEIPT | X:X:X |
| 1318 | PRIORITY | 1 |

FIG. 16

PRINTER OPTION

JOB PRIORITY (J): [1 ▲▼] (1 TO 99)

ALTERNATE OCCURRENCE CONDITIONS:

- ☑ ERROR OCCURRENCE (E)
- ☐ PORTS UNUSABLE (P)
- ☐ NUMBER OF JOBS TO BE PRINTED (N) [0] JOBS OR MORE
- ☐ SIZE OF JOBS TO BE PRINTED (S) [0] KB OR MORE

[OK] [CANCEL] [HELP (H)]

PRINT CONTROL PROGRAM AND MEDIUM AND INFORMATION PROCESSING APPARATUS

BACKGROUND OF THE INVENTION

1. Field of the Invention

The present invention relates to a mechanism for reprinting by using a temporarily stored spool file for printing.

2. Related Background Art

There is a known transfer technology for sequentially transferring file data written as a spool file via an OS without waiting for completion of spooling in a mechanism of Windows (registered trademark).

There is also a known technology for creating a unique spool file apart from the spool file for printing created in the mechanism of Windows (registered trademark) and using the spool file for reprinting.

For instance, Japanese Patent Application Laid-Open No. 2002-196916 discloses a retransfer technology for temporarily spooling print data transferred to a printer for the sake of using it after finishing the transfer, and retransferring the stored and spooled print data to the printer.

However, in the past technologies retransferring the unique spool file prepared for a retransfer can be performed as long as the print data is re-readable and the spooling is already finished and the process is performed in sequential processing.

For instance, there is a problem that, even if a state of the printer incapable of continuing the printing is recognized while spooling the print data, it is necessary to wait until the spooling of the spool file is finished and so it takes time until retransferring the spool file to another device.

The present invention has been implemented in consideration of the problem, and an object thereof is to provide a print control mechanism capable of retransferring at higher speed in the mechanism for retransferring the print data by using the unique spool file.

SUMMARY OF THE INVENTION

Accordingly, the present invention is conceived as a response to the above-described disadvantages of the conventional art.

According to one aspect of the present invention, preferably, in a mechanism for print control executed by an information processing apparatus, print data created and spooled via a print data creation module is spooled again, and spooling of the print data of the unique spooling and sending of the print data to a resending destination or an alternate device are concurrently performed.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 8 shows an example of a print setting screen according to the embodiment;

FIGS. 13A and 13B are diagrams showing examples of job information in FIG. 12;

FIG. 16 shows an example of the print setting screen according to the embodiment;

DESCRIPTION OF THE PREFERRED EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Hereafter, preferred embodiments of the present invention will be described by referring to the attached drawings.

First Embodiment

Figure 1:
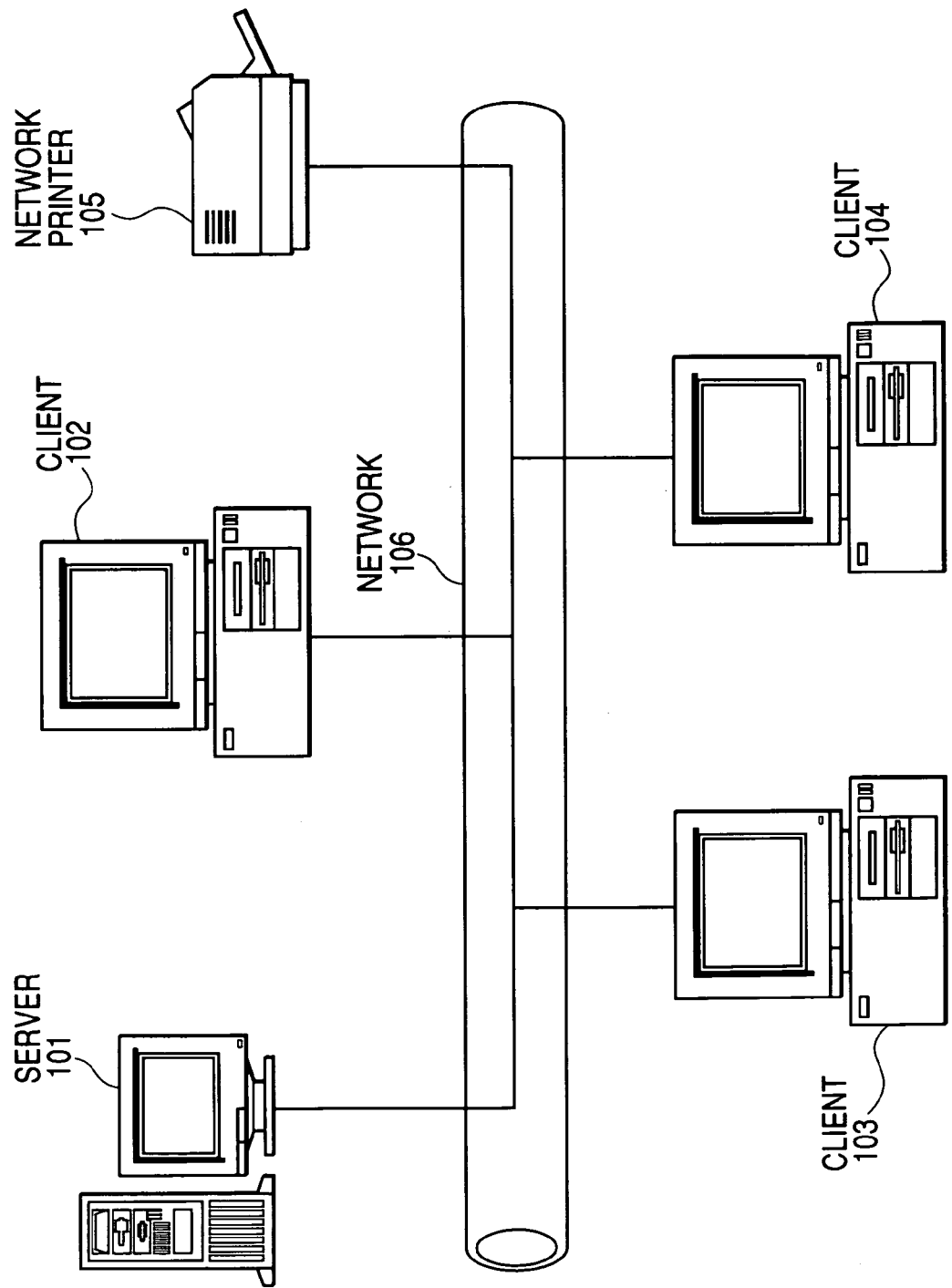
FIG. 1 is a diagram showing a configuration of a print processing system according to an embodiment.

FIG. 1 is a block diagram explaining a configuration of an information processing system to which the present invention is applicable. It is assumed that one client computer or a plurality of client computers are connected in this system.

In FIG. 1, reference numerals 102, 103 and 104 are information processing apparatuses as the client computers (clients), and are connected to a network 106 by a network cable such as Ethernet (registered trademark). Each of the client apparatuses 102 to 104 is capable of executing various programs such as an application program, and has a printer driver with a function of converting print data into a printer language corresponding to a printer mounted thereon. It is possible to register a plurality of printer drivers. Reference numeral 101 denotes the information processing apparatus as a server according to this embodiment (hereafter, referred to as a print server), and is connected to the network 106 by the network cable. The print server 101 accumulates files used by the network, and monitors a use status of the network 106. The print server 101 manages a plurality of printers connected to the network 106.

The clients 102 to 104 and the print server 101 can be constituted by executably storing a print control program for exerting different control on general information processing apparatuses respectively.

In the case of using the general information processing apparatus as the print server 101, it is also possible to simultaneously provide to it the functions of the clients 102 to 104. The print server 101 according to this embodiment further has the functions of storing print jobs including the print data outputted from the clients 102, 103 and 104 and having them printed by the printers, receiving the print jobs including no print data from the clients 102, 103 and 104, managing print order of the clients 102, 103 and 104 and notifying the client of the turn of a permission to send the print jobs including the print data, or obtaining various kinds of information on a status of a network printer 105 and the print jobs and notifying the clients 102, 103 and 104 thereof.

Reference numeral 105 denotes the network printer, and is connected to the network 106 via a network interface not shown. The network printer 105 analyzes the print jobs including the print data sent from the client computers 102 to 104 and converts them into a dot image page by page so as to print them page by page. Reference numeral 106 denotes the network, and is connected to the clients 102, 103 and 104, server 101, network printer 105 and so on.

Although only one network printer 105 is shown in FIG. 1, a plurality of network printers are connected in reality. Furthermore, the network printer 105 is equivalent to a device 614 described later. And it goes without saying that image forming apparatuses of various recording methods are applied to the device 614, such as a laser beam printer, a copying machine, a digital complex machine and a facsimile of an electrophotographic method and the printer and digital complex machine of an inkjet method.

Figure 2:
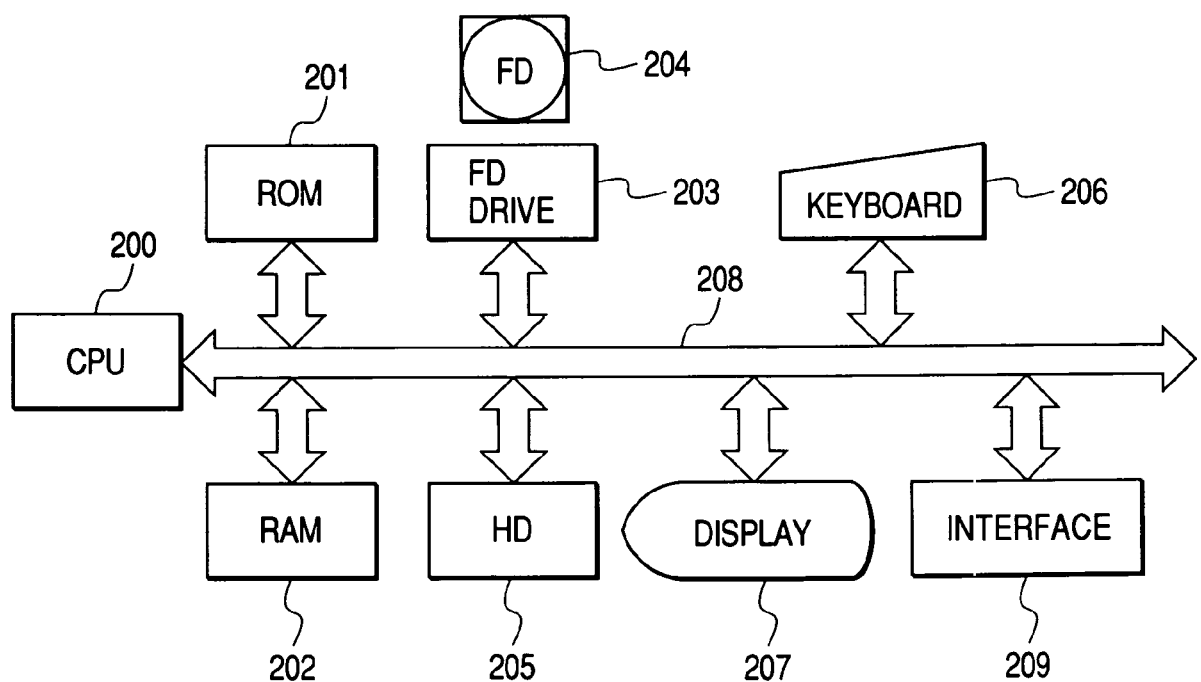
FIG. 2 is a block diagram showing a configuration of a computer in the print processing system according to the embodiment.

FIG. 2 is a block diagram explaining a configuration of an information processing apparatus usable as the clients 102 to 104 and print server 101 according to this embodiment. As described above, it is possible to implement the clients 102, 103 and 104 and server 101 with the information processing apparatuses of the same hardware configuration. Hereafter, FIG. 2 will be described as the block diagram explaining the configuration of the client and server.

In FIG. 2, reference numeral 200 denotes a CPU as control means of the information processing apparatus, which executes the application program, printer driver program, OS and a network printer control program of the present invention and so on stored in a hard disk (HD) 205 and exerts control to temporarily store the information, files and so on necessary for executing the programs in an RAM 202.

Figure 5:
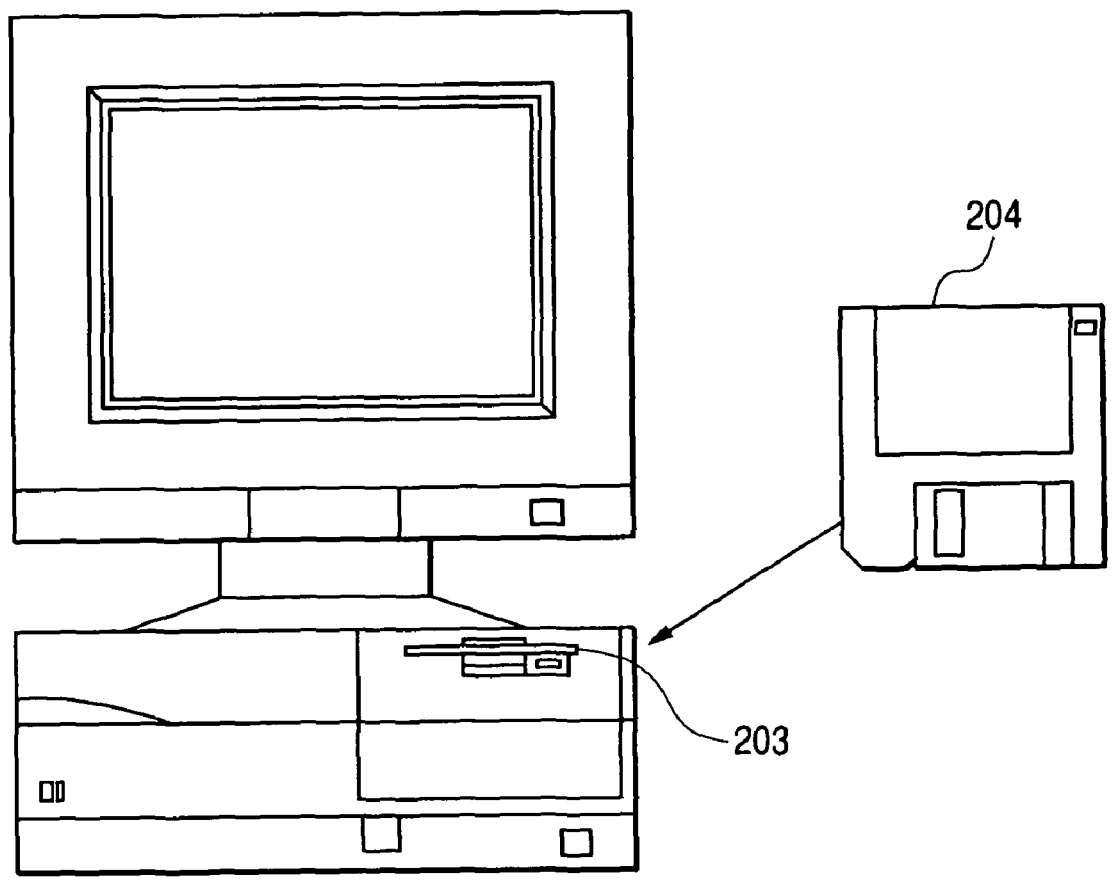
FIG. 5 is a diagram showing a relationship with the FD inserted into an FD drive of the computer according to the embodiment.

Reference numeral 201 denotes an ROM which stores various kinds of data including the programs such as a basic I/O program, font data used for document processing and the data for templates inside. Reference numeral 202 denotes the RAM for providing temporary storage means, which functions as a main memory, a work area and so on of the CPU 200. Reference numeral 203 denotes a flexible disk (FD) drive, which is able to load the programs and so on stored in an FD 204 as a storage medium on this computer system through the FD drive 203 as shown in FIG. 5 described later. Reference numeral 204 denotes a flexible disk (FD) as a storage medium, which is the storage medium having the computer-readable programs stored therein. As for the storage medium, it is not limited to the FD but an arbitrary medium may be used, such as a CD-ROM, a CD-R, a CD-RW, a PC card, a DVD, an IC memory card, an MO or a memory stick.

Reference numeral 205 denotes one of external storage units which is a hard disk (HD) for functioning as a large-capacity memory. The HD 205 has the application program, printer driver program, OS, network printer control program, related programs and so on stored therein. A spooler as spooling means is secured on the HD 205. The spooling means refers to a client spooler as to the clients 102 to 104, and refers to a server spooler as to the print server 101. The print server 101 also has a table for storing job information received from the clients 102 to 104 and controlling the order thereof generated and stored in the external storage unit (HD 205).

Reference numeral 206 denotes a keyboard for inputting an instruction. Through the use of the keyboard 206, a device control command and so on are inputted to the client computer by a user or to the print server by an operator or an administrator. It is also feasible to provide a pointing device (not shown) for the sake of inputting the instruction.

Reference numeral 207 denotes a display, which displays the commands inputted from the keyboard 206, the status of the printer and so on. Reference numeral 208 denotes a system bus, which controls data flow inside the computers as the client and print server. Reference numeral 209 denotes an interface, and the information processing apparatus is connected to the network 106 via the interface 209 to be capable of exchange of the data with external devices.

Figure 3:
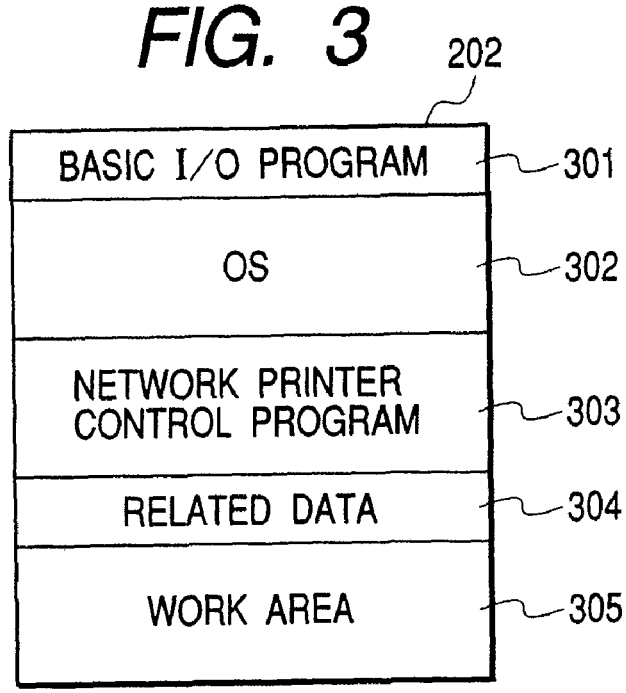
FIG. 3 is a diagram showing an example of an RAM memory map of the computer according to the embodiment.

FIG. 3 is a diagram showing an example of a memory map of the RAM 202 shown in FIG. 2. FIG. 3 shows the memory map of the status in which the network printer control program stored on the FD 204 is loaded on the RAM 202 and is executable.

This embodiment shows the example of having the network printer control program and related data directly loaded from FD 204 on the RAM 202 and thereby executed. However, it is also possible, other than that, to load them from the HD 205 having the network printer control program already installed thereon to the RAM 202 each time the network printer control program is operated from the FD 204. The medium for storing the network printer control program may be the CD-ROM, CD-R, PC card, DVD, IC memory card and so on other than the FD. Furthermore, it is possible to store the network printer control program in the ROM 201 and render it as a portion of the memory map so as to execute it directly by the CPU 200. It is also possible to constitute a substitute for a hardware unit with software for implementing the functions equal to the above apparatuses.

The network printer control program may be simply called as the print control program. The print control program includes the program for ordering a change of a print destination of a print job and ordering a change of print order on the clients 102 to 104. The print control program includes the program for controlling order of the print jobs and notifying an end of printing of the print jobs and a request for the change of print order on the print server 101. The print control program for exerting such control according to this embodiment may be divided into a module to be installed on the clients 102 to 104 and a module to be installed on the print server 101. It is also possible for one print control program to function for the clients or for the print server according to an environment in which it is executed. And it is also possible to install both the module for functioning for the clients and the module for functioning for the print server on one computer so as to artificially perform parallel operation simultaneously or time-dividedly.

In FIG. 3, reference numeral 301 denotes the basic I/O program, which is the area containing the program having an IPL (Initial Program Loading) function of having the OS read from the HD 205 to the RAM 202 and starting an operation of the OS on turning on the power of this control unit. Reference numeral 302 denotes an operating system (OS) and 303 denotes the network printer control program, and they are stored in the area secured on the RAM 202 respectively. Reference numeral 304 denotes related data, which is stored in the area secured on the RAM 202. Reference numeral 305 denotes a work area, where working space to be used on execution of the printer control program (303) of this embodiment by the CPU 200 is secured.

Figure 4:
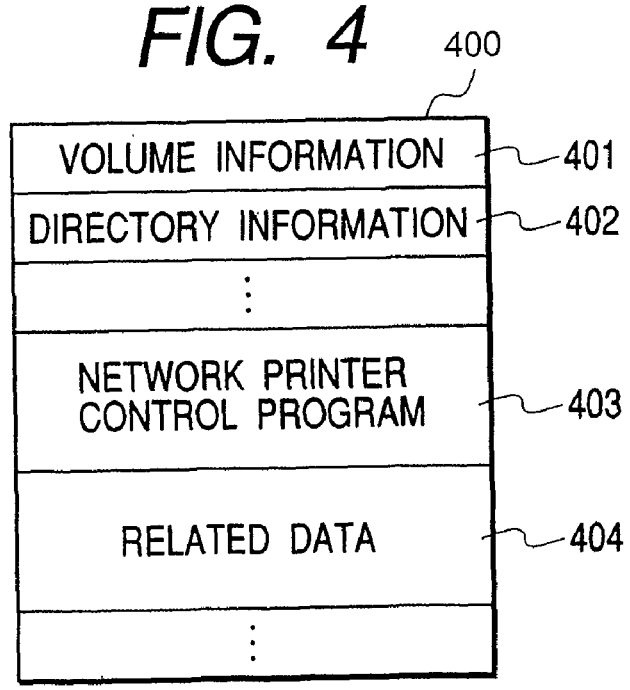
FIG. 4 is a diagram showing an example of an FD memory map according to the embodiment.

FIG. 4 is a diagram showing an example of a memory map of the FD 204 shown in FIG. 2. In FIG. 4, reference numeral 400 denotes the data contents of the FD 204, 401 denotes volume information indicating data information, 402 denotes directory information, 403 denotes the network printer control program as the print control program described in this embodiment, and 404 denotes the related data thereof. The network printer control program 403 is a program implemented based on a flowchart described in this embodiment, where both the client and server have the same configuration according to this embodiment.

FIG. 5 is a diagram showing a relationship with the FD 204 inserted into an FD drive 203 shown in FIG. 2, and those which are the same in FIG. 2 are given the same symbols. In FIG. 5, the FD 204 has the network printer control program and the related data thereof described in this embodiment stored therein as described in FIG. 4.

Next, a print control process for operating based on the above-mentioned configurations will be described.

Figure 6:
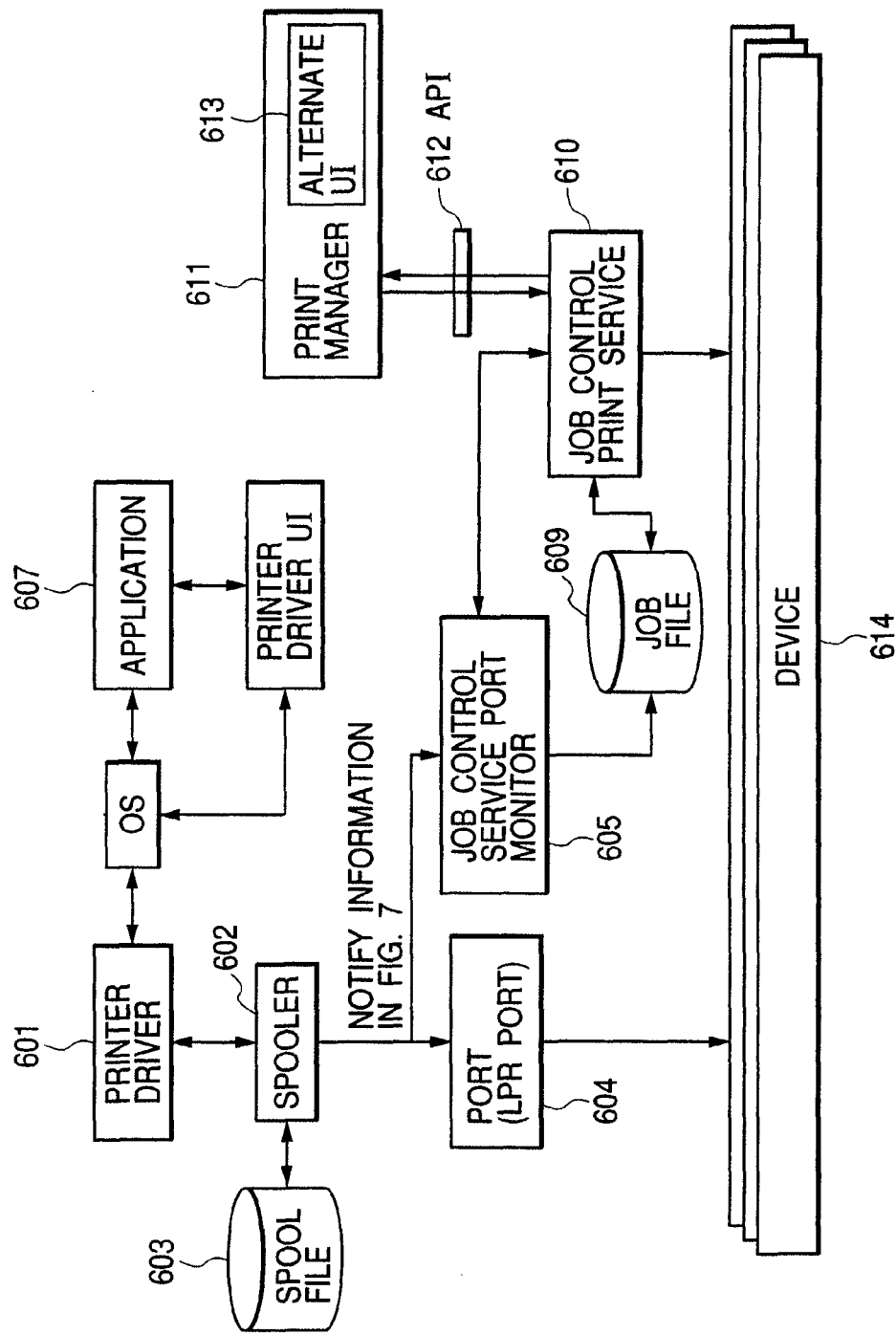
FIG. 6 is a diagram showing an overview of a print control system according to the embodiment.

FIG. 6 is a diagram showing an overview of a print system according to this embodiment.

A print instruction is provided via an application UI (hereafter, the UI is referred to as a user interface) displayed in a display portion of the client computer. Based on this print instruction, the print instruction via the OS is provided from the application to a printer driver 601. The printer driver 601 creates page description language data based on a drawing instruction (DDI) provided via the OS. This page description language data includes both drawing data and job control data. The page description language data may be called the print data according to this embodiment. Hereafter, a description will be given by taking as an example a form in which the print data is created by the printer driver. However, it is not limited thereto. For instance, an application 607 may include the functions of the printer driver in the case where it is a form application. The printer driver and application are applied if they function as a print data creation module.

The created page description language data is written as a spool file 603 by a spooler 602. In the case where a port associated with the printer selected from the application is an LPR port 604, the print data transferred from the spooler 602 by using an LPR protocol is sent to the device 614. The print data sent to the device 614 is sequentially erased after sending. In the case where the port associated with the printer is a job control service port monitor 605, the print data transferred from the spooler 602 goes through the job control service port monitor 605 and a job file 609 is spooled again.

Figure 7:
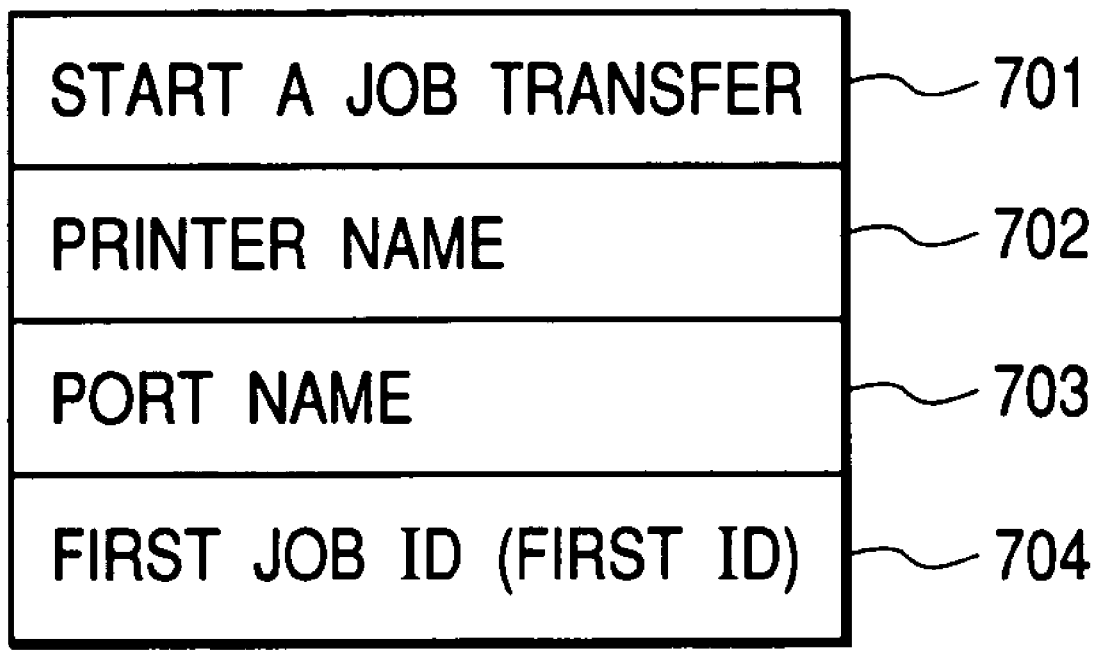
FIG. 7 shows an example of job start notice information according to the embodiment.

When the print data is transferred from the spooler 602 to the job control service port monitor 605, a port name in FIG. 7 is identified. FIG. 7 shows an appearance of the information notified from the spooler 602 to the job control service port monitor 605 on starting a despool.

FIG. 7 will be described here. Reference numeral 701 denotes a start of a job transfer, and 702 denotes a printer name. The printer name 702 is corresponding to the printer name according to the user's instruction and selected from a pull-down menu 801 in FIG. 8. The printers corresponding to the printer names shown in 801 in FIG. 8 have port names corresponding thereto. And if one of the plurality of printers is selected, a display corresponding to the port is performed as indicated by 901 in FIG. 9.

Reference numeral 703 denotes a preset port name corresponding to the printer name selected from 801 in FIG. 8. It is equivalent to 901 in FIG. 9.

Reference numeral 704 is corresponding to a job ID issued via a mechanism of the OS according to a print request. 704 should be associated with the ID for identifying the print request issued via the OS.

Figure 9:
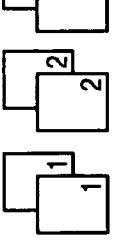
FIG. 9 shows an example of the print setting screen according to the embodiment.

To describe FIGS. 8 and 9 further in detail, FIG. 8 shows an example of a print setting screen displayed in the display portions of the clients 102 to 104 on printing. FIG. 8 shows a list of a plurality of printers selectable by the clients 102 to 104, and indicates that a "Printer E" is selected from a selection list of 801.

A "Printer A" denotes an ordinary printer associated with the port 604, a "Printer C" denotes a PDF (Portable Document Format (registered trademark)) writer, and "Automatic alternate" and "Broadcast" denote virtual printers for printing for a plurality of devices 614. And a "Printer B" and a "Printer D" are registered as member printers. As for the "Printer B" and "Printer D," it is possible to directly select them and perform printing in addition to the printing from the virtual printers.

FIG. 9 shows the display in FIG. 8 changed in the case of selecting the "Printer E." Reference numeral 901 denotes the port name of the "Printer E."

Returning to the description of FIG. 6, after receiving the information shown in FIG. 7, the job control service port monitor 605 notifies a job control print service 610 of the received information in FIG. 7 as a job start notice. This notice should include at least a first job ID (also referred to as a first ID). In response to the job start notice (S1402) from the job control service port monitor 605, the job control print service 610 responds with a second job ID (also referred to as a second ID) for identifying the print request inside the job control service and a pass of the job file 609 corresponding to the second ID (S1403). Furthermore, the job control service port monitor 605 writes the print data submitted from the spooler to the job file 609, and notifies the job control print service 610 of writing of the job (S1404).

On receiving a notice of a job written to the job file (S1404) from the job control service port monitor 605, the job control print service 610 sequentially reads the page description language data written to the job file 609 and sends it to a corresponding device of the plurality of devices 614.

Figure 11:
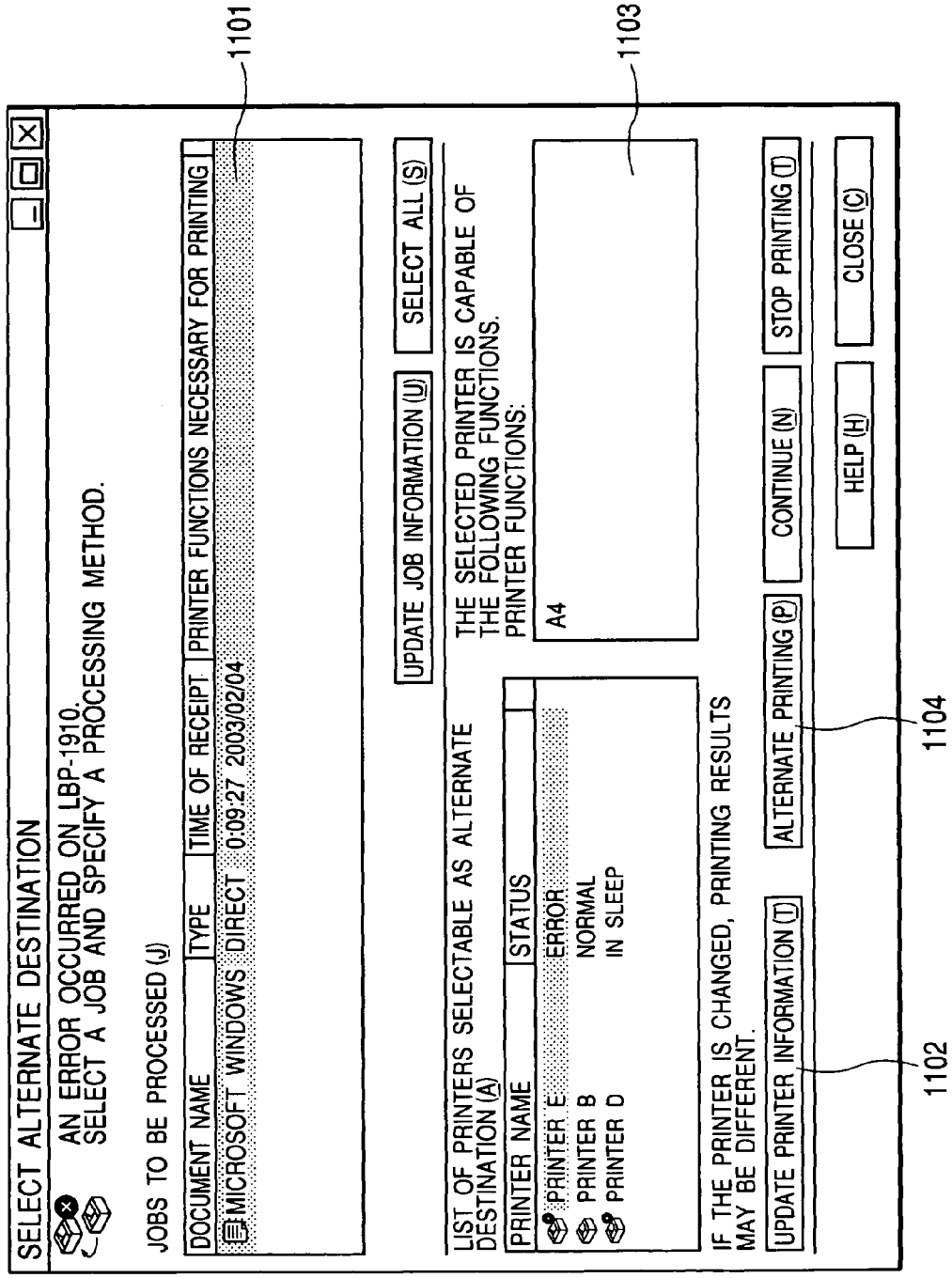
FIG. 11 shows an example of the print setting screen according to the embodiment.

A print manager 611 sends and receives various kinds of information to and from the job control print service 610 via an API 612. For instance, the print manager 611 creates the UI reflecting the notice of status information on the devices 614 monitored by the job control print service 610, and provides an input screen of various print instructions. In particular, an alternate UI 613 displays the UI having the function of ordering alternate printing on a client screen in response to receipt of failure information on the devices 614 from the job control print service. Here, the UI to be displayed is shown in FIG. 11, which will be described in detail later.

Figure 10:
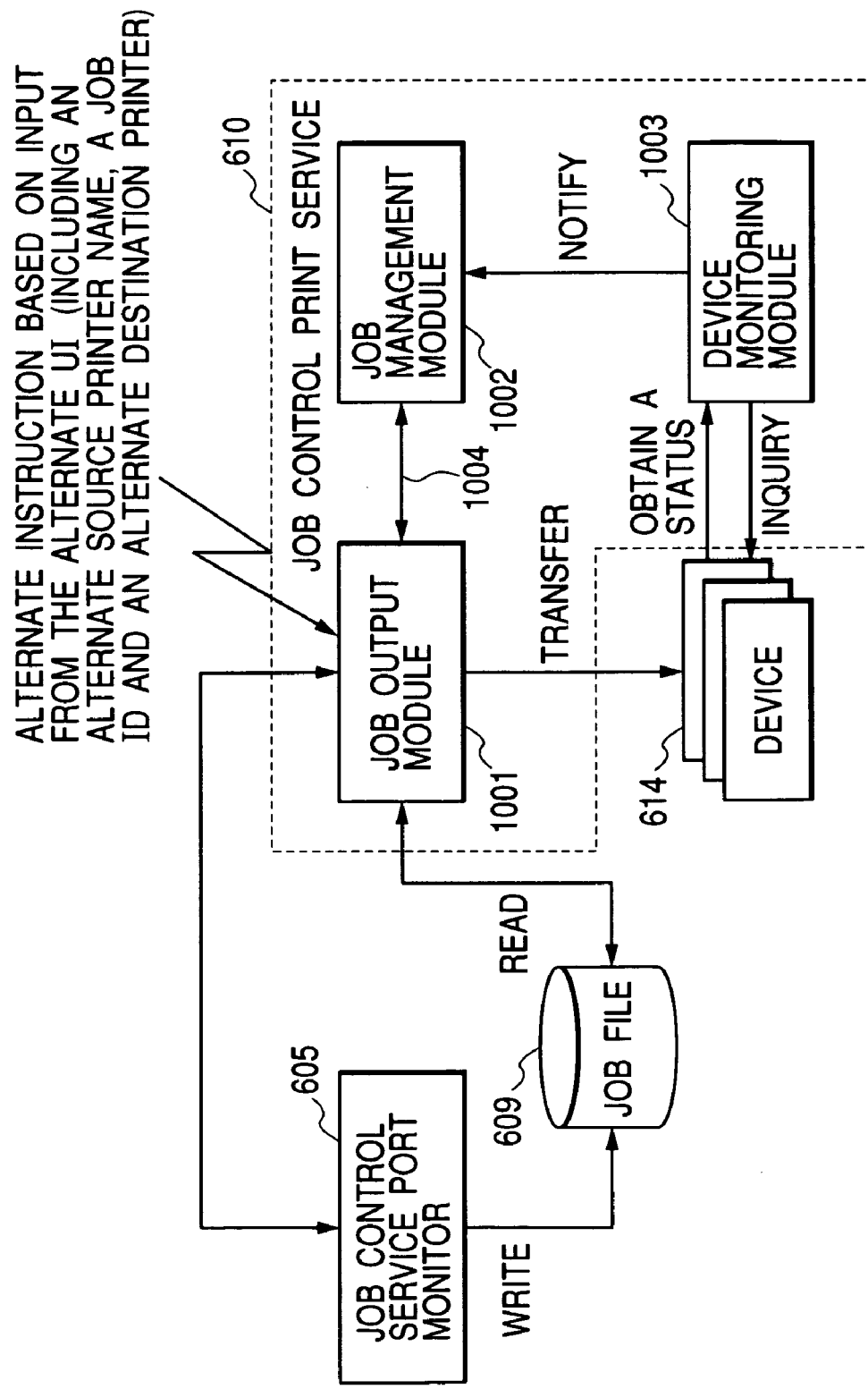
FIG. 10 is a diagram showing details of the print control system according to the embodiment.

FIG. 10 shows the details of the job control print service 610 in FIG. 6. Each block in 610 denotes an object of which unit is a program code and data accompanying it as one.

A job output module 1001 controls transmission of the print data to the devices 614.

A device monitoring module 1003 comprises the function of monitoring the status information on the devices via a communications line such as a network cable. The device monitoring module 1003 also comprises the functions of making an inquiry to the devices and receiving the status information voluntarily notified from the devices.

The status information includes error information such as a runout in consumables including paper and toner, a jam and an open door in the devices 614, load information on the devices 614 such as the number of reserved jobs therein and so on. A job management module 1002 or the job output module 1001 notifies the print manager 611 described above of detected failure information as the job control print service 610.

The job management module 1002 comprises the function of mediating sending and receiving of the information between the device monitoring module 1003 and the job output module 1001. It also comprises the function of controlling sending order of the jobs in the cases where the job control print service 610 operates as a server program on the aforementioned server 101 and/or there are a plurality of jobs for performing job output to the same device in the output module. A bidirectional arrow 1004 in FIG. 10 indicates a schedule (output order control) request and a schedule up (output start instruction).

Figure 12:
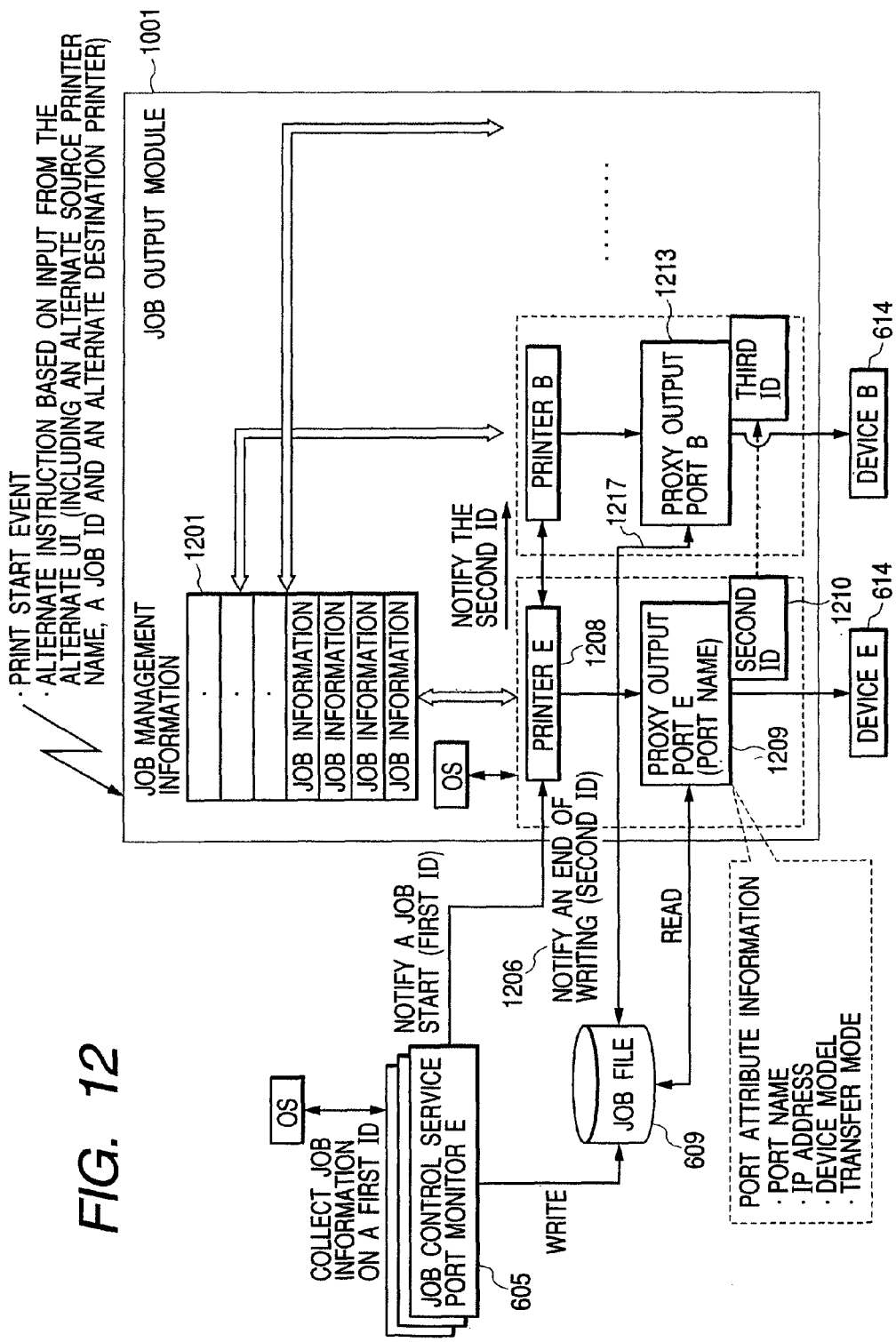
FIG. 12 is a diagram showing the details of the print control system according to the embodiment.

FIG. 12 shows the details of the job output module 1001. Each block in 605 and 1001 denotes the object.

The jobs are managed in the units of the printer and a proxy output port inside the job output module 1001. It corresponds to the printer and ports registered with the spooler of the OS, and has extensive printer information required to exert control inside the job control print service 610. As described in FIG. 16 for instance, the settable printer information includes a job priority, an alternate occurrence condition such as the number of jobs to be printed deserving alternate printing and so on.

Figure 17:
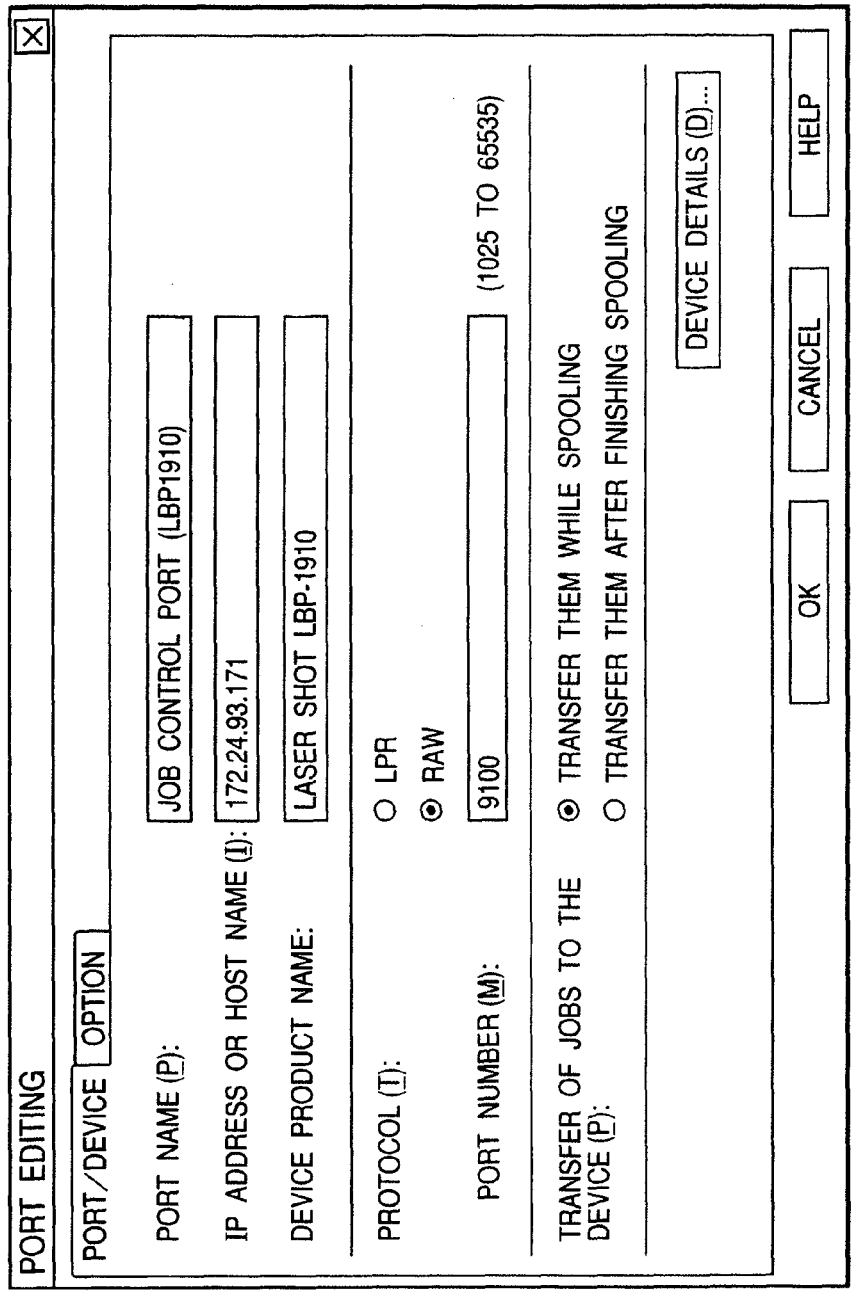
FIG. 17 shows an example of the print setting screen according to the embodiment.

As described in FIG. 17, optional attributes of the port (proxy output port) include a transmission protocol, a method of transfer to the device and so on in addition to an address and a model name of the device.

The job received by the printer is transferred to the device via a corresponding proxy output port. In the case where there are a plurality of proxy output ports denoting one device, the print data received by the printer is controlled as to its order by the proxy output ports and is sequentially transferred to the device.

Figure 14:
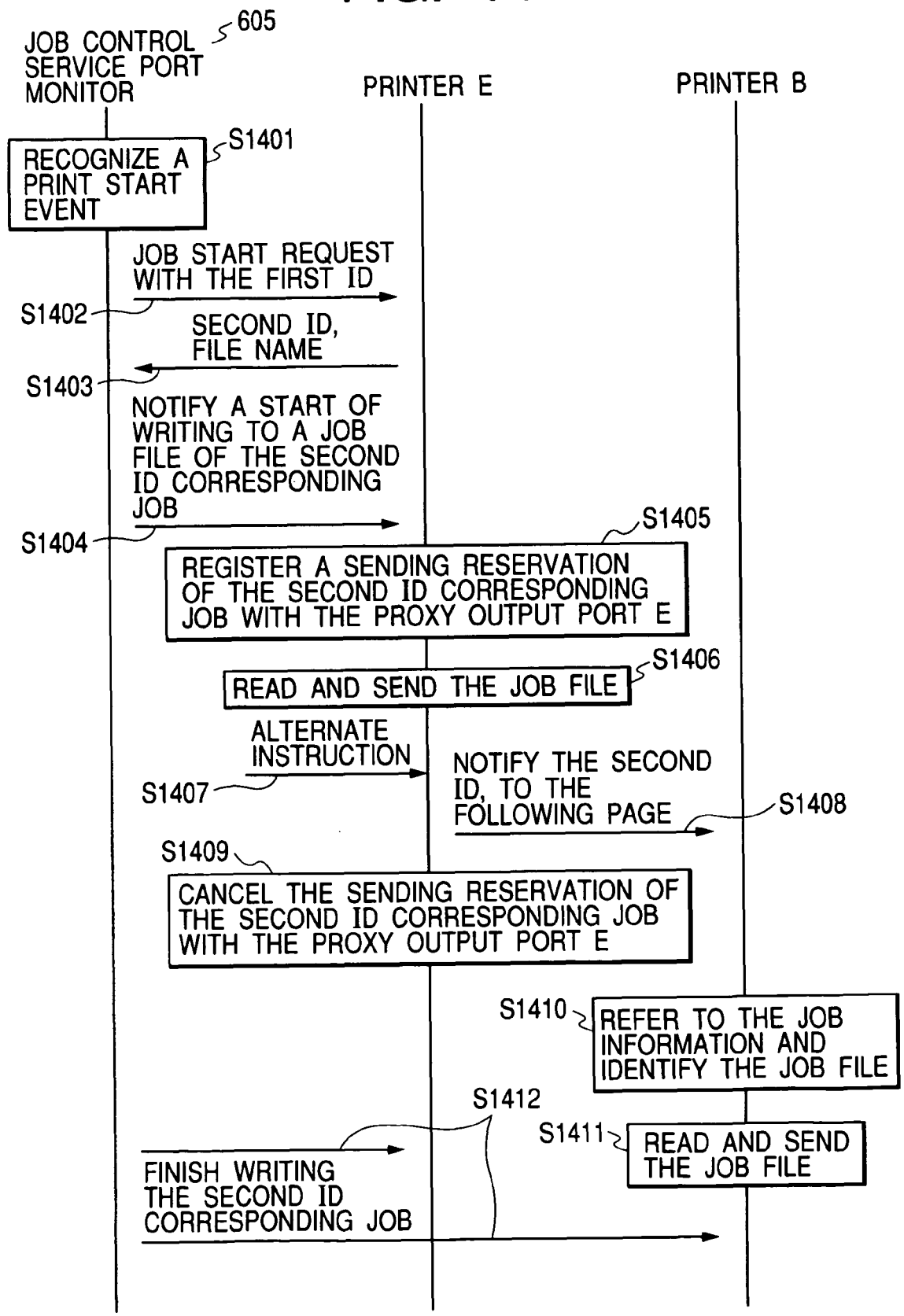
FIG. 14 is a diagram showing a flowchart of a print control process according to the embodiment.
Figure 15:
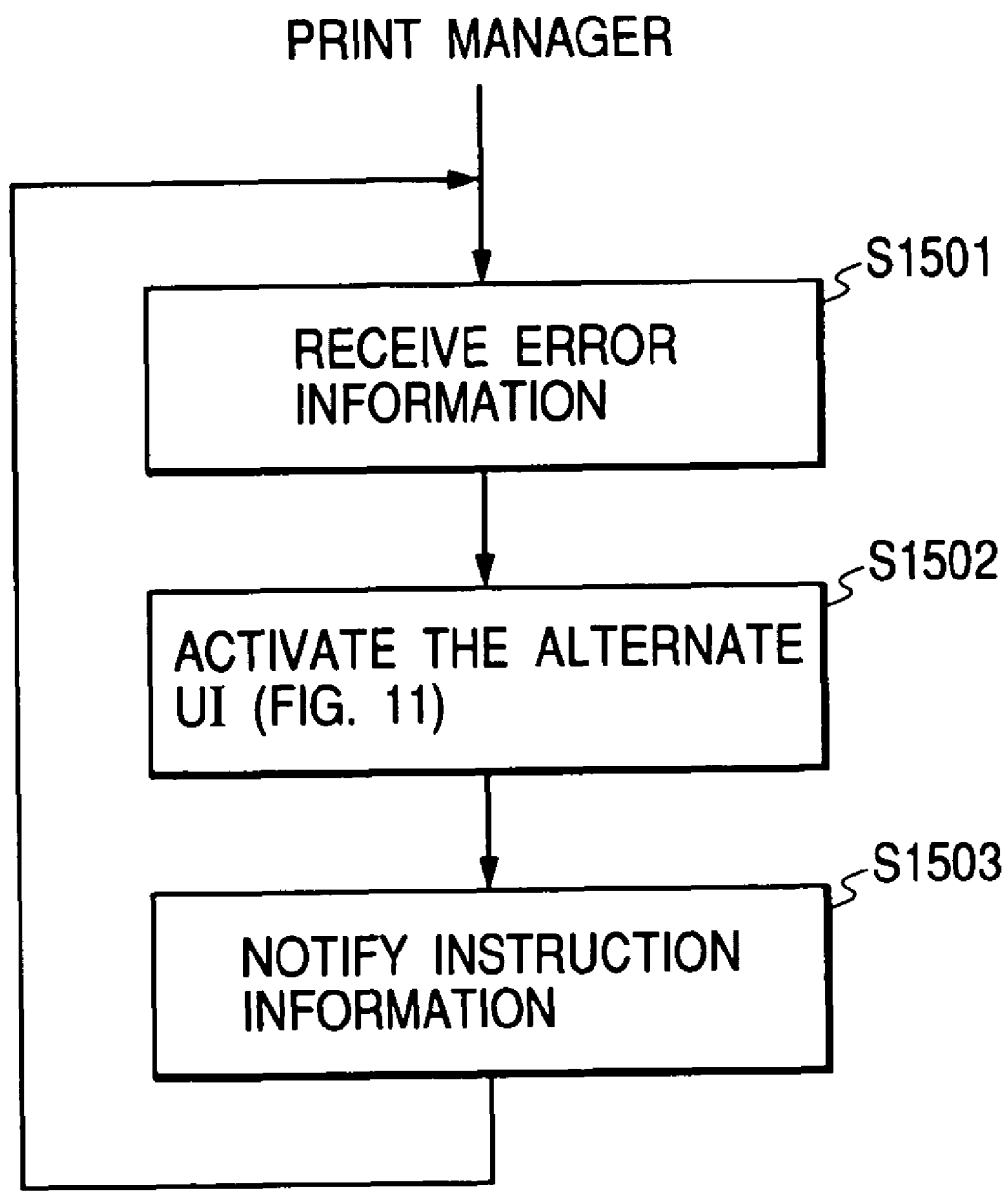
FIG. 15 is a diagram showing a flowchart of the print control process according to the embodiment.

Next, the flowchart in FIG. 14 will be described together with FIGS. 11, 12, 13A, 13B, 15, 16 and 17. FIG. 14 is corresponding to a process of uniquely spooling again the print data created and spooled via the printer driver and concurrently performing the unique spooling and the transmission of the uniquely spooled print data to an agent destination device.

If the print instruction is provided from the application to the Printer E set up via the user interface shown in FIG. 9, the Printer E in the job output module 1001 is notified of a print start event from the OS, which is then recognized as the print start event in the step S1401. On detecting issuance of the new job, the Printer E selects and generates an unused second ID from job management information, and registers the job information with job management information 1201 together with the job attribute and the first ID obtained from the OS. As for detection of the issuance of the new job by the Printer E, the Printer E may detect it either directly or via a predetermined software module. The job management information 1201 is stored on the RAM 202 and is accessible at high speed while a copy of the job attribute described in FIG. 13 is stored as a file on the HD 205 so as to be usable together with the job file 609 on rebooting a PC.

As shown in FIG. 13A, the details of the job information which are stored are a file name 1304 of the job file 609, a printer name 1305, a port name 1306, a job status 1307, a time of receipt 1308 and a priority 1309 in addition to correspondence to a first ID 1303, a second ID 1301 and 1302. The information on 1310 to 1318 in FIG. 13B is corresponding to 1301 to 1309 in FIG. 13A, and so a detailed description thereof will be omitted here. It is possible, by creating a job identifier and an original job identifier shown in FIGS. 13A and 13B, to appropriately transfer the print data spooled in the job file 609 to the device apart from a spooling process of the job file 609 tied to an OS job ID.

The job information is searchable by extracting it in an arbitrary combination of the job identifier, original job identifier, printer name and first ID, and is constituted to be accessible from a printer 1208, a proxy output port 1209 and so on by an API 612 and an internal interface not shown. The job identifier is also searchable singly. The proxy output ports 1209 and 1213 in FIG. 12 are described separately from the Printer E and Printer B. However, it is also possible to include them in predetermined functional modules of the Printer E, Printer B and so on.

As a result of the print instruction, the data drawn by the application program is spooled by the spooler 602 of the OS through the DDI, and the spool file 603 is created. The spooler 602 sequentially reads the file to notify the job control service port monitor 605 of job data.

If notified of the start of sending the job data to the job control service port monitor 605 from the spooler 602, the job control service port monitor 605 notifies the Printer E of a job start request including the information shown in FIG. 7 in the step S1402.

In the step S1403, the job control service port monitor 605 receives as a response in the step S1402 the second ID and file name of the job information shown in FIG. 13 searched by using the printer name and first ID as keys, of the job management information 1201 updated by the Printer E based on the notice in the step S1401.

On receiving the job data from the spooler 602, the job control service port monitor 605 starts writing the job to the file of a job file name of the job corresponding to the second ID based on the information received in the step S1403, and notifies the Printer E of the second ID and start of writing of the job in the step S1404. On receiving the notice in the step S1404, the Printer E performs a sending reservation and registration of the job corresponding to the second ID to a proxy output port E in a step S1405. And the proxy output port E registers the second ID registered from the Printer E with a queue 1210 of the jobs to be sent.

The print control program according to the embodiment of the present invention is capable of exclusively selecting whether or not to concurrently perform the operation of the spooling process of the job file 609 on the job control service port monitor 605 and a sending process at the proxy output port.

To concretely describe how it is selectable, a "Transfer of jobs to the device" checkbox is equivalent to a selection button in FIG. 17. In the case where "Transfer them while spooling" is selected, a spooling operation and the sending process are concurrently performed. And in the case where "Transfer them after finishing spooling" is selected, the transfer is performed after completion of the spooling as with the programs in the past. This setting screen in FIG. 17 is prepared for setting up each proxy output port.

In the case where "Transfer them while spooling" is selected as the attribute of a transfer mode, the proxy output port E has transfer candidates picked up without waiting for a second ID job writing completion notice in the step S1412 described later. The sending order of the jobs marked as the transfer candidates is determined based on the priority, time of receipt and so on from the job information shown in 1201 and FIGS. 13A and 13B. A method of determining the sending order of the jobs will not be described in detail here because it is not directly related to the present invention.

If the jobs identified by the second ID registered by the Printer E reach the sending order, the proxy output port E corresponding to the Printer E reads the job file 609, and sends the read print data to the device 614 (printer device E) in a step S1406. On receiving the print data to be sent, the printer device E performs recording on a medium based on the print data. Thus, it is possible, with the functions of the proxy output port, to implement the control for concurrently transferring the print data to an output destination device while continuing the unique spooling of the print data created via the printer driver to the job file 609 so as to provide a print control mechanism of high-speed throughput.

Here, if the print manager 611 is notified of the occurrence of a predetermined failure on the device via the device monitoring module 1003 (corresponding to a step S1501), the alternate UI 613 as shown in FIG. 11 is activated by the print manager 611 (corresponding to a step S1502).

To describe FIG. 11 in detail here, the list of the printers displayed in "List of printers selectable as alternate destination" in FIG. 11 is corresponding to the Printer E, Printer B and so on comprising the proxy output port in FIG. 12.

The alternate UI 613 displays the printer functions and equipment (1101) necessary for executing the jobs to which the alternation occurred and printing thereof and the list of the printers capable of the alternation and the statuses thereof (1104). 1101 displays the job information such as the printer functions and equipment identified based on the print data spooled in the spool file 603. For instance, it performs the displays related to the functions such as whether or not there is a staple function and whether or not a paper feed cassette of predetermined-size paper is provided.

Furthermore, on selecting an alternate destination printer candidate such as a Printer B, the information on optional configurations (paper size, staple, double-side and so on) of the printer is displayed on a printer function screen (1103). As for the printer related to the present invention, the jobs are transferred while spooling and so there are the cases where the job attribute is not defined on the occurrence of the alternation. To be more precise, there are the cases where all the print data is not spooled in the spooler 602, and the number of pages of all the print data is not determined or the paper size is not determined and so on.

FIG. 11 does not display the necessary functions for the printing. In such a case, however, it is possible, by pressing an "Update printer information" button described as 1102, to have job and printer attribute and status information obtained by the job control print service 610 from the print manager 611 so as to display the job information or alternate destination printer status according to a current processing status. It is also possible to have the print manager 611 asynchronously notified of the latest change in the processing status from the job control print service 610 so as to detect it and redisplay the alternate UI in FIG. 11.

Figure 18:
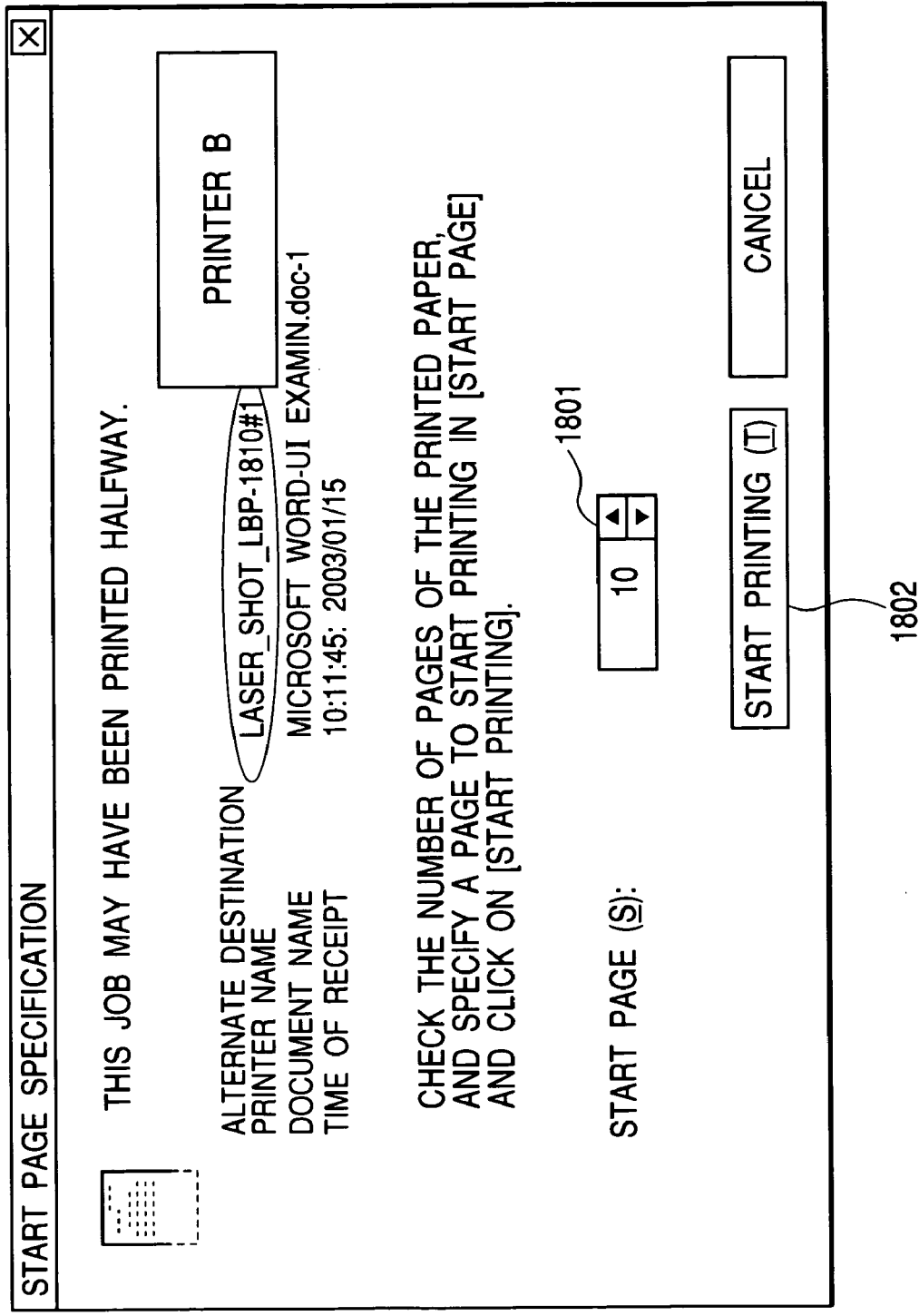
FIG. 18 shows an example of the print setting screen displayed on providing an instruction to 1104.

And if the instruction is provided to 1104, the UI (print setting screen) shown in FIG. 18 is displayed. It is possible to specify a print start page (logical page) on the alternate destination printer from the client via the UI in FIG. 18. The details will be described later.

Returning to the description of FIG. 14, if specification of the alternate printer is inputted to this print system via the alternate UI in FIG. 11, the Printer E is notified of an alternate instruction via the API 612 in a step S1407 (corresponding to a step S1503).

FIG. 14 shows the case where the instruction to specify the Printer B as the alternate destination printer is inputted to this print system via the alternate UI in FIG. 11.

In a step S1408, the Printer E notifies the Printer B of at least the second ID and page information or copies information indicating a print range to be continuously outputted.

Here, the print range to be outputted will be described in detail.

(1) It is based on the number of ejected surfaces obtained by an event from the device on ejection or polling from the device monitoring module to the device 614.

(2) It is based on an output start page on the alternate destination printer as in FIG. 18.

First, to describe (1) in detail, the device monitoring module 1003 is notified of the event each time a sheet of a physical medium is ejected.

In case the event is missed, the number of ejected surfaces is obtained by polling. Specifically, when the device monitoring module 1003 detects the status incapable of continuing the printing from the device 614, it obtains the number of ejected surfaces on the device 614 by polling. It is possible to obtain a more reliable number of ejected surfaces by standing by for a predetermined time and performing the polling from the device monitoring module 1003.

Next, to describe (2) in detail FIG. 11 is presented to the user by having the alternate UI 613 displayed by the print manager 611 according to an ejection status of an alternate source printer when the status incapable of continuing the printing on the device 614 is detected by the device monitoring module 1003 (the job control print service 610).

In the case where no sheet (physical medium) is ejected as to the ejection status of the alternate source printer, FIG. 18 is not displayed. For instance, in the case where the ejection of nine sheets of the physical medium is confirmed, "10" is set as an initial value as shown in 1801 in FIG. 18. For instance, it is possible to have the start page set by the user in the case where an ejected page is stained or the detection of the device monitoring module is wrong for some reason.

In the case where even one sheet is ejected, it displays in 1801 the UI in FIG. 18 in which the start page with the number of ejected surfaces added is set as the initial value. And if the instruction is provided with a Start printing button 1802 in FIG. 18, a "Continued page" set in the start page 1801 and all of the job files 609 are sent to the device 614. It is also possible to transfer the job files 609 from the page falling under the "Continued page" to the alternate destination device 614 or regenerate the job files 609 from the page falling under the "Continued page."

In a step S1409, the Printer E having received the alternate instruction in the step S1407 provides cancel and deletion instructions of the jobs corresponding to the second ID to the proxy output port E concurrently with the process in the step S1408. If the spooling process is continued in this case, only the sending process is canceled, and the job status 1307 is indicated as "Spooling-Deleting" and the job information in FIG. 13A is left in the job management information 1201.

In a step S1410, the Printer B having received the notice in the step S1408 generates a third ID for newly managing the jobs, and refers to the job information (FIG. 13A) corresponding to the second ID (job identifier or original job identifier) from the job management information 1201 by using the second ID indicating an alternated job so as to copy and set it as a third ID job attribute. The information for referring to the job attribute to be copied may be any information capable of identifying an alternate source job.

In this case, the attribute of the Printer E unique to the Printer E (attribute not to be taken over) such as the job status (Spooling—Deleting for the Printer E, and To be transmitted for the Printer B) is not copied. FIG. 13B shows the job information thus created.

And in a step S1410, it is possible, on alternation or resending of the print data, to send spooled data to the printer device of the alternate destination or a resending destination while continuing the spooling of the data already spooled before the alternation or resending. It is thereby possible, without necessity to starting over the spooling process performed for the Printer E for the Printer B, to exploit the spooling process performed on the Printer E for the new alternate destination or resending destination.

In a step S1411, the print data created and spooled via the printer driver is uniquely spooled (job files 609) again as with the step S1406, and the unique spooling and sending of the uniquely spooled print data to the alternate destination are concurrently performed. The process in the step S1411 and the process of the job files 609 by the job control service port monitor 605 are concurrently performed under different IDs. To be more precise, even in the case where the alternation occurs, the job control service port monitor 605 continues from the data already spooled without starting over the writing to the job files 609 from the beginning. To be further specific, in the case where the alternation occurs from the Printer E to the Printer B, the job file 609 to be spooled under the third ID is written from continuation of an existing portion of the job file 609 previously written correspondingly to the second ID by the job control service port monitor 605.

Thus, it is possible, with the functions of the proxy output ports in the steps S1406 and S1412, to realize print control capable of continuing the unique spooling of the print data created via the print driver to the job file 609 while performing the processes of the steps S1404 to S1412 and concurrently transferring the print data to the alternate destination device.

For instance, in the case where the spooling of the job files 609 is already completed by 80 percent by the job control service port monitor 605 when the Printer B receives the notice in the step S1408, the Printer B can appropriately transfer necessary portions of the already spooled files to the alternate destination printer device. The necessary portions may be the spool files from the beginning (page information based on the notice in S1408 is added in the case of sending it to the device 614) or the spool files from the page based on the notice in S1408 for instance. The updated information is reflected on the UI in FIG. 11 as an "Update printer information" button 1102 is pressed.

In the case where the writing to the job files 609 is finished by the job control service port monitor 605, a synchronization signal of job file writing completion is notified (step S1412). The synchronization signal may be notified either directly to the Printer B or by using a semaphore (a mechanism for performing synchronization and control of interruption processing between concurrently operating processes, and a signal exchanged for the purpose).

As indicated by 1206 in FIG. 12, a writing completion notice having the second ID attached is sent from the job control service port monitor 605 to the Printer E. The Printer E updates the job management information 1201 based on defined job attribute information (paper size, number of copies and so on). On this update, all the job information having the original job identifier (second ID) is updated. Thus, it is possible to manage the job files 609 which are spooled again based on the predetermined notice using the second ID together.

The Printer B (proxy output port B) having detected the synchronization signal in the step S1412 recognizes that there is no more job file to be sent and also finishes the job sending process on completion of reading of the job files to be sent to the printer device B which existed on the detection in the step S1411. Furthermore, it is also possible, as another form, to notify the Printer E and Printer B of the completion of writing of the jobs corresponding to the second ID from the job control service port monitor 605 or to notify the Printer E from the job control service port monitor 605 and notify the Printer B as the alternate destination from the Printer E.

If the completion of printing on the printer device B is detected by the device monitoring module 1003 and is notified to the job output module 1001 via the job management module 1002, the job information (FIGS. 13A and 13B) and the job files 609 are deleted from the job management information 1201 so as to complete the print processing.

Thus, according to the first embodiment, it is possible to uniquely spool the print data created and spooled via the printer driver again and concurrently perform the unique spooling and sending of the uniquely spooled print data to the alternate destination device so as to promptly start sending to the device the unique spool files required for resending of the print data and transfer to another device.

It is also possible to create the second ID to the uniquely spooled print data apart from the first ID issued via the OS correspondingly to the print data created via the printer driver so as to perform the job management based on the second ID, that is, correspondingly to the ID (second ID or third ID) issued separately from the original job. Therefore, it is now feasible to perform job trace and management accompanied by the resending and alternation even after finishing a unique process of the OS such as a despool from the spooler 602 to the job control service port monitor 605. Furthermore, it is now feasible to securely perform the job trace and management even if the information processing apparatus (PC) is rebooted and the OS issues the ID (first ID) overlapping the job ID issued by the OS in the print processing before the reboot.

In the past, the unique spool files were transferred and resent on the assumption that the writing of the unique spool files was already finished, and so it was not necessary to be conscious of the completion of the writing of the spool files. As opposed to this, according to this embodiment, it is now possible to detect the completion of the writing to the unique spool files (job files 609). Therefore, it is now possible, even in the case where there is no more unique spool file to be sent in the form of sending the unique spool files to the device while writing to the unique spool files, to recognize the completion of the unique spool files so as to securely finish sending the unique spool files.

Incidentally, the word "unique" has been used as to the spool in the above description. However, it is not essentially limited thereto. To be more specific, it is applicable if the ID is capable of managing the job file 609 to be re-spooled as a different job from the spool file 603.

For instance, the job control service port monitor 605 includes the functions of the job control print service 610, and re-spools the "spool file 603'" by using the spooler 602 of the OS while holding the job file 609 so as to restore it to the job control service port monitor 605.

And it is possible to manage a "job file 609'" resent correspondingly to the ID issued from the OS against the "spool file 603'" so as to concurrently perform the spooling of the print data to be re-spooled (job file 609) and sending of the print data (job file 609') to the resending destination or alternate destination device.

Second Embodiment

As for the first embodiment, it was described that the Printer E performs the processing by using the Printer B as the alternate destination printer. According to a second embodiment, it will be further described that the Printer B performs the alternate process. The print system of the second embodiment also has the same mechanism as in FIGS. 1 to 17. Here, the differences from the first embodiment will be described.

In the case where the alternation of the job corresponding to an alternate ID 3 further occurs on the Printer B, a fourth ID is generated by the Printer D if the Printer D is specified as the alternate destination of the job of the third ID by the alternate UI. And the third ID indicating the alternated job is used to copy necessary job attributes from the job information (FIG. 13B) corresponding to the third ID from the job management information 1201 so as to create new job information. To be more specific, the processing in the steps S1410 and S1411 described above is performed to create the new job information equivalent to FIG. 13B. And deletion of the job information according to the step S1412 is performed as with the first embodiment.

As with the step S1408, the Printer B notifies the Printer D of the information on the third ID and second ID and the page information or copies information indicating the print range to be continuously outputted. This notice should include at least the second ID so that the Printer D as a notified source can identify various attributes such as the file names corresponding to the second ID of the original job identifier of a notifying source.

Furthermore, the Printer B provides the instructions to cancel and delete the jobs corresponding to the third ID of the proxy output port B as in the step S1409. If the spooling process is continued in this case, only the sending process is canceled, and a job status 1316 is indicated as "Spooling-Deleting" and the job information displayed in FIG. 13B is left in the job management information 1201.

Third Embodiment

As for the first and second embodiments, it was described that a sending mode setting of the proxy output port is followed on the alternation. According to a third embodiment, the process following an alternate source (proxy output port E of the Printer E) setting will be further described. The print system of the third embodiment also has the same mechanism as in FIGS. 1 to 17. Here, the differences from the first and second embodiments will be described.

In the step S1402, if notified of the start of the spooling of the job and the port name from the job control service port monitor 605, the Printer E obtains a sending mode setting of the proxy output port E (transfer mode in FIG. 12) and additionally stores it as the job attribute information in the job information of FIGS. 13A and 13B (not shown in FIGS. 13A and 13B).

Here, if the alternate instruction as in the step S1407 is inputted, the proxy output port B as the alternate destination determines the job attribute. And it marks as a sending candidate the job of which writing start is notified from the job control service port monitor 605 in the case where the job attribute is "Transfer them while spooling" even if the sending mode setting of the proxy output port B is "Transfer them after finishing spooling."

The unique spool file corresponding to the marked job is immediately sent to the device even during the spooling irrespective of the sending mode setting of the proxy output port B.

In the case where there are a plurality of marked jobs, one job to be sent is determined according to a predetermined priority. The sending mode is copied as the job information of the alternate destination when the job information is referred to on the alternate destination printer (Printer B) in the step S1410.

Thus, according to the third embodiment, it is possible, even if an alternate destination port setting (attribute) is the mode of "Transfer them after finishing spooling," to continue the initially specified printer port setting (attribute) initially intended by the user so as to realize high-speed printing as intended by the user.

As described above, according to the first and second embodiments of the present invention, it is possible, even if a printer status incapable of continuing the printing is recognized while spooling the print data, to promptly retransfer the spool file to another device without necessity to wait for the completion of spooling of the spool file.

According to the third embodiment, it is also possible, even if the alternate destination port setting is the mode of "Transfer them after finishing spooling," to continue the port setting initially intended by the user so as to realize the high-speed printing as intended by the user.

In addition, as can be appreciated by those of ordinary skill in the art, the present invention may be implemented by either a single device or by a system comprising a plurality of devices.

It should be noted that a software program for implementing the capabilities of the above-described embodiment, supplied either directly from a recording medium or by using wire or wireless communications, to a system or apparatus having a computer capable of executing such program, the execution of such program by the computer of the system or apparatus achieving equivalent capabilities of the above-described embodiment, is included in the present invention.

Accordingly, a program supplied to and installed in such a computer for the purpose of implementing the functional processes of the present invention itself achieves the present invention. That is, a computer program for implementing the processes performed by the present invention is itself included within the present invention.

In such a case, provided the program capabilities are present, the format of the program, whether executed by object code or by an interpreter, for example, does not matter.

The recording media for supplying the program include, but are not limited to, magnetic recording media such as a floppy disk, a hard disk or magnetic tape, optical or magneto-optical recording media such as MO, CD-ROM, CD-R, CD-RW, DVD-ROM, DVD-R or DVD-RW, or a non-volatile semiconductor memory.

Wire and wireless methods of supplying the program to the system or apparatus described above include, but are not limited to, a computer program that forms the present invention on a server on the computer network, or storing a data file (that is, a program data file) that can become a computer program that forms the present invention on a client computer, such as a compressed file with a self-installing capability, and downloading the program data file to a connected client computer. In this case, the program data file can be divided into a plurality of segment files and the segment files disposed at different servers.

In other words, a server device that downloads to a plurality of users a program data file for implementing the function processes of the present invention by computer is also included within the present invention.

As can be appreciated by those of ordinary skill in the art, the program of the present invention may be encrypted and stored on a recording medium such as a CD-ROM and distributed to users, with decryption data for decrypting the encryption being made available to users who fulfill certain conditions for example by downloading from a home page via the Internet, the users then using the decryption data to execute the encrypted program for installation on a computer.

In addition, as can be appreciated by those of ordinary skill in the art, in addition to implementing the capabilities of the above-described embodiments by reading out and executing the above-described program by computer, the above-described capabilities of the embodiments described above can also be implemented by Operating System (OS) software running on a computer and performing some or all of the actual processes described heretofore based on the program instructions.

Moreover, the present invention also includes an instance in which the above-described capabilities of the embodiments described above are achieved by processes executed in whole or in part by a CPU or the like provided in a function expansion card or a function expansion unit based on program code instructions, after the program code read from the recording medium is written to a memory provided in such a function expansion card inserted into the computer or such a function expansion unit connected to the computer.

The present invention is not limited to the above embodiments, and various changes and modifications can be made within the spirit and scope of the present invention. Therefore, to apprise the public of the scope of the present invention, the following claims are made.

What is claimed is:

1. A non-transitory storage medium having a print control program to be executed by a computer stored therein in a computer-readable form, wherein the program comprises:
    a spooling step of spooling print data created and spooled via a printer driver;
    an outputting step of outputting the spooled print data to an original destination printer;
    a changing step of changing a printing destination from the original destination printer to an alternation destination printer before said spooling step has completed the spooling of the print data and before said outputting step has completed the outputting of the spooled print data to the original destination printer; and
    a control step of canceling the outputting of the spooled print data to the original destination printer without canceling the spooling of the print data, concurrently performing the spooling of a portion of the print data which has not yet been spooled such that the spooling is performed after a portion of the print data already spooled without restarting from the beginning, and performing the outputting of a portion of the print data spooled before the changing in said changing step to the alternation destination printer.

2. The storage medium according to claim 1, wherein, on alternation or resending of said print data, said control step continues the spooling of the data already spooled before the alternation or resending.

3. The storage medium according to claim 1, wherein the program further comprises:
    an ID creation step of creating a first ID issued correspondingly to the print data created via said printer driver and a second ID to the print data spooled in said spooling step apart from said first ID; and
    a management step of performing job management corresponding to the second ID created in said ID creation step.

4. The storage medium according to claim 3, wherein the first ID is an ID issued via an OS.

5. The storage medium according to claim 3, wherein the program further comprises:
    a notification step of notifying said second ID to an alternation destination printer specified of a plurality of printers via an alternate setting screen;
    an identification step of identifying the print data to be alternated based on said second ID notified in said notification step; and
    a reading step of reading the print data identified in said identification step,
    wherein said control step concurrently processes the spooling of the print data in said spooling step and said reading step.

6. The storage medium according to claim 5, wherein each of said plurality of printers has port information set up correspondingly.

7. An information processing apparatus for exerting print control, comprising:
    a spooling unit, adapted for spooling print data created and spooled via a print data creation module;
    an outputting unit, adapted for outputting the spooled print data to an original destination printer;
    a changing unit, adapted for changing a printing destination from the original destination printer to an alternation destination printer before said spooling unit has completed the spooling of the print data and before said outputting unit has completed the outputting of the spooled print data to the original destination printer; and
    a control unit, adapted for canceling the outputting of the spooled print data to the original destination printer without canceling the spooling of the print data, concurrently performing the spooling of a portion of the print data which has not yet been spooled such that the spooling is performed after a portion of the print data already spooled without restarting from the beginning, and performing the outputting of a portion of the print data spooled before the changing by said changing unit to the alternation destination printer;
    wherein at least one of the units is a hardware unit.

8. The information processing apparatus according to claim 7, wherein, on alternation or resending of said print data, said control unit continues the spooling of the data already spooled before the alternation or resending.

9. The information processing apparatus according to claim 7, further comprising:
    an ID creation unit, adapted for creating a first ID issued correspondingly to the print data created via the print data creation module and a second ID to the print data spooled by said spooling unit apart from said first ID; and
    a management unit, adapted for performing job management corresponding to the second ID created by said ID creation unit.

10. The information processing apparatus according to claim 7, wherein the first ID is an ID issued via an OS.

11. The information processing apparatus according to claim 9, further comprising:
    a notification unit, adapted for notifying said second ID to an alternation destination printer specified of a plurality of printers via an alternate setting screen;
    an identification unit, adapted for identifying the print data to be alternated based on said second ID notified by said notification unit; and
    a reading unit, adapted for reading the print data identified by said identification unit,
    wherein said control unit concurrently performs the spooling of the print data by said spooling unit and the reading by said reading unit.

12. The information processing apparatus according to claim 11, wherein each of said plurality of printers has port information set up correspondingly.

* * * * *